United States Patent
Ervin et al.

(10) Patent No.: US 6,175,887 B1
(45) Date of Patent: Jan. 16, 2001

(54) DETERMINISTIC ARBITRATION OF A SERIAL BUS USING ARBITRATION ADDRESSES

(75) Inventors: Joseph James Ervin, Stow; Sandip P. Barua, Lowell; John Michael Mulligan, Jr., Methuen, all of MA (US)

(73) Assignee: Sun Microsystems, Inc., Palo Alto, CA (US)

( * ) Notice: Under 35 U.S.C. 154(b), the term of this patent shall be extended for 0 days.

(21) Appl. No.: 09/176,298

(22) Filed: Oct. 21, 1998

(51) Int. Cl.$^7$ .............................. G06F 13/14; G06F 13/40
(52) U.S. Cl. ........................... 710/113; 710/107; 710/126
(58) Field of Search .................... 710/113, 62, 63, 710/3, 100, 129, 126, 119, 242, 7, 105, 107; 712/31; 709/208; 340/825.06; 370/462

(56) References Cited

U.S. PATENT DOCUMENTS

| | | |
|---|---|---|
| 4,373,183 | 2/1983 | Means et al. . |
| 4,763,249 | * 8/1988 | Bomba et al. . |
| 5,388,232 | * 2/1995 | Sullivan et al. . |
| 5,459,840 | * 10/1995 | Isfeld et al. . |
| 5,857,156 | * 1/1999 | Anderson . |

OTHER PUBLICATIONS

Philips Semiconductors, "The 1$^2$C–bus and how to use it (including specifications)," Apr. 1995, pp. 1–24.

* cited by examiner

*Primary Examiner*—Gopal C. Ray
(74) *Attorney, Agent, or Firm*—Conley, Rose & Tayon, PC; B. Noël Kivlin

(57) ABSTRACT

An apparatus, system, and method for arbitrating for a serial bus in an efficient manner. An arbitration phase includes master devices asserting respective arbitration addresses on the serial bus after initiating communications sequences with a START condition. After the arbitration phase, the controlling master device conveys a data transfer upon the serial bus. The serial bus and the devices connected thereto may operate according to an I$^2$C-compatable protocol. The arbitration address may correspond to a slave address associated with a slave device. Each arbitration address is preferably associated with only one master device. The arbitration address preferably initiates a READ cycle, and the slave device responds with a data byte. The data byte may be stored, discarded, or ignored by the master device, as desired. The arbitration address may not be associated with any slave device coupled to the serial bus. The master device is configured to continue the communications sequence without receiving acknowledge signals from a slave device during or after the arbitration phase. The master device continues the communications sequence with a repeated START condition and repeated address and data phases for the transfer of data. Each arbitration address may be associated with an arbitration device coupled to the serial bus. Acting as a slave device responsive to multiple slave addresses, the arbitration device may accept WRITE data and/or send READ data in response to receiving the arbitration address. The arbitration device properly acknowledges all addresses and data transfers in which it is involved.

43 Claims, 5 Drawing Sheets

DETERMINISTIC ARBITRATION OF A SERIAL BUS USING ARBITRATION ADDRESSES

BACKGROUND OF THE INVENTION

1. Field of the Invention

This invention relates to computing systems, and more particularly to an apparatus, system, and method for deterministically arbitrating for a serial bus, preferably in an I²C environment.

2. Description of the Related Art

Serial communications are primarily differentiated from parallel communications by the transmission of data at the rate of one bit at a time. Serial communications are also simpler to implement since only a single data channel, either a single data line or a single differential pair, is needed. In recent years, serial communications have been increasingly popular with the introduction of such technologies and protocols as EEE 1394, the universal serial bus (USB), and the Inter IC (integrated circuit) bus, or I²C.

While 1394 and USB are primarily aimed at the computer system level, I²C was designed for serial communications between integrated circuits. Examples of such integrated circuits include single-chip microcontrollers, LCD drivers, random access memories (RAM), digital signal processors (DSPs), tuners, and DTMF generators. It is noted that the I²C protocol is also implemented by the ACCESS.bus for connecting peripherals to a computer.

Other than for power, only two lines are needed for an I²C-compatible bus, a serial data line (SDA) and a serial clock line (SCL). Each device is addressable by a unique address that may be set by software. The bus is controlled by a master device addressing a slave device, where the master device issues clock pulses on the serial clock line while transmitting data bits on the serial data line. The data line and the clock line are passively pulled HIGH except when a device actively asserts a LOW logic signal on the data line or clock line. A data bit is valid on the data line when the data bit is stable when the clock line is clocked HIGH. The I²C protocol only allows for data changes while the clock line is LOW.

Turning to FIG. 1, a typical I²C-compliant system 100 is shown. A plurality of master devices 110A–110C and a plurality of slave devices 120A–120C are each coupled to the serial data line 130 and the serial clock line 140. It is noted that the total number of master devices 100, also referred to as master-transmitters, and slave devices 210, also referred to as slave-receivers, may be varied as desired up to the I²C capacitance limit for the serial bus of 400 pF. Master devices such as the first master device 110A are unable to also act as slaves, while master devices such as the second master device 110B, using what are termed master-receivers 112, are also capable of acting as slave devices. Master device 110B is shown including master-receiver 112 and control logic 113 for controlling access to the serial bus through bus interface logic 111.

Devices coupled to a serial bus, such as the I²C-compatible bus, often each have a unique address associated with the device. FIG. 2 illustrates the complete set of addresses 200 for devices connected to an I²C-compatible serial bus. Addresses are transmitted on the data line 130 as 8-bit bytes. The first seven bits are an actual device address and the eighth bit is the read/write bit, a "1" for a READ cycle and a "0" for a WRITE cycle. Using the 7-bit default addressing scheme, 128 device addresses are theoretically available in the complete set of addresses 200. Sixteen of these addresses are reserved 205. In any given implementation, some number of addresses will be in use (assigned to devices connected to the bus) 210 and the remainder of the addresses will be available 220.

It is noted that in the I²C protocol, master devices 110 are assigned addresses in at least two cases. First, when the master device 110C issues "hardware general calls". This situation applies to "dumb" master devices 110C that do not know the address of the slave device 120 to which they wish to transmit data. The dumb master device 110C thus issues a hardware general call in a first byte and its own address in the second byte. The second case is where the master device 110B includes a master-receiver 112, or is otherwise capable of becoming a master-receiver.

Communication sequences 300 on the serial bus are detailed in FIG. 3. A master device 110 is only allowed, under the I²C protocol, to take control of the serial bus when the serial bus is free 299, that is, when no data transmission traffic from another communication sequence 300 is taking place over the serial bus. A communications sequence 300 comprises, as a minimum, a START condition 310, an initial address phase 320, an initial data phase 330, and a STOP condition 390. The communications sequence 300 may optionally also include one or more repeated START conditions 315, repeated address phases 325, and repeated data phases 335. Shown in a flowchart embodiment in FIG. 3, the communications sequence 300 of an I²C-compliant bus includes decision blocks 340 and 345 for continuing or ending the communications sequence 300.

It is noted that the initial data phase 330 and the repeated data phases 335 may include the transfer of a data block comprising one or more bytes of data. A slave device receiving the data block typically acknowledges each byte of data in the data block, upon receipt. A master device receiving the data block typically acknowledges each byte of data in the data block, upon receipt, except for the final byte. This alerts the sending slave device that the data phase 330/335 is at an end.

The START condition 310 comprises a master device 110 transitioning the data line 130 from a logic HIGH to a logic LOW while the clock line 140 is at a logic HIGH. Similarly, the STOP condition 390 comprises the master device 110 transitioning the data line 130 from the logic LOW to the logic HIGH while the clock line is at the logic HIGH. Address and data bits from the address 320/325 and data 330/335 phases are transmitted on the data line 130 and held stable at either logic LOW or logic HIGH while the clock line 140 is clocked at logic HIGH. The logic HIGH or logic LOW of the data line 130 is only changed when the clock line 140 is at the logic LOW. It is noted that a logic LOW preferably represents a "0" and logic HIGH preferably represents a "1".

It is noted that in the I²C environment, master devices 110 generate their own clock signals on the clock line 140. All devices attached to the serial bus are connected to the clock line 140 in a wired-AND configuration. Once clocked LOW by a master device 110, the wired-AND holds the clock line 140 in the LOW logic state until all devices communicating over the bus are ready for the next clock logic HIGH. One purpose of the wired-AND is to prevent a fast master 110 device from transmitting too quickly to a slow slave device 120. The slave device 120 can stretch out the logic LOWs of the clock cycle on the clock line 140 until the slave device 120 is able to accept a next data bit on the data line 130. If necessary, the master device 110 enters wait states until the slave device 120 releases the clock line 140 and the clock line transitions to the logic HIGH.

Arbitration for control of the bus in an I²C environment is such that, at any time during which the bus is free, any or all of the master devices 110 may start a new communications sequence 300 on the bus. The I²C arbitration scheme is completely non-deterministic. It is possible for two or more masters 110 to transfer the same data byte to the same slave device 120 in the same communications sequence 300 with no ill effects on the I²C system. In fact, all of the master devices 110 involved would continue as if they were the controlling master device 110 on the bus.

Whenever two or more master devices 110X and 110Y generate the START condition 310 on the data line 130 of the serial bus at the same time, each master device 110X/110Y proceeds to convey the initial address 320 on the data line 130 addressed to a respective slave device 120X/120Y, which may be the same slave device 120X. As the default state of the data line 130 is logic HIGH, any bit transmitted as a "1" on the data line 130 simply is clocked on the clock line 140. If the master device 110Y conveys a "1" while the master device 110X conveys a "0", then the master device 110Y will read the "0" on the data line 130 while conveying a "1". Thus the master device 110Y will know that another master device 110X is also on the bus, and the master device 110Y will relinquish control of the bus to the master device 110X, master device 110Y having lost in arbitration.

This arbitration method has the effect of giving priority on the serial bus to the master device 110 which conveys the numerically lowest bit on the data line 130 during any given clock cycle. Any master device 110 that transmits a zero on the data line 130 will have priority over a master device 110 that transmits a one. The I²C protocol allows for a master device 110 that looses arbitration to continue clocking the bus until the end of the current byte being transmitted. The master device 110 that is the last remaining master device 110 after the arbitration phase ends is referred to as the controlling master device 110.

Several difficulties may arise because of the I²C arbitration scheme in a multi-master environment. The simplest of which is that a master device 110 which loses arbitration has lost clock cycles during which the master device 110 could be doing something else. For example, a microcontroller that directs its arithmetic logic unit (ALU) towards data transmission over the serial bus and loses arbitration multiple bytes later has lost 16 or more clock cycles that could be used for computations.

Problems that are more insidious can arise when the losing master device 110 does not cleanly exit from its unfulfilled communications sequence 300. For example, the I²C protocol is unclear as to the proper exit conditions when one master device 110X issues the repeated START condition 315 and another master device 110Y issues the STOP condition 390. This situation is possible if both master devices 110X/110Y read a first data byte from the same slave device 120X, and then the first master device 110X attempts to read a second data byte while the second master device 110Y attempts to end the communications sequence 300. Other complex error conditions are also possible.

What is needed is a way to guarantee that the arbitration phase ends quickly and deterministically on the serial data bus. It would be preferred that arbitration end by the eighth clock cycle of a failed communications sequence. It would thus be desirable to have an apparatus, system, and method for speeding up arbitration in the multi-master environment. The apparatus, system, and method are preferably compatible with the I²C protocol and usable with existing I²C devices.

SUMMARY OF THE INVENTION

The problems outlined above are in large part solved by an apparatus, system, and method for arbitrating for a serial bus in an efficient manner. By ending arbitration for the bus quickly and deterministically, the system may advantageously be more stable and less computational time may be lost by master devices that lose in the arbitration. The arbitration phase includes master devices asserting respective associated arbitration addresses on the serial bus after initiating communications sequences with a START condition. After the arbitration phase, the controlling master device, the master device that won the arbitration for control of the serial bus, asserts one or more data transfers upon the serial bus. In a preferred embodiment, the serial bus and the devices connected to the serial bus operate according to an I²C-compatable protocol.

As contemplated in one embodiment, a system comprises a serial bus, including a data line and a clock line, and a master device coupled to the serial bus. The master device transfers data on the data line of the serial bus in a communications sequence including a START condition, an arbitration phase, and a data transfer phase. The arbitration phase includes the master device conveying an associated arbitration address on the data line of the serial bus. In an I²C environment, the arbitration phase comprises the initial address phase. The master device conveys the associated arbitration address on the data line of the serial bus as the initial address.

Similarly, a method is also contemplated, comprising in one embodiment where a master device and a slave device are coupled to a serial bus, the master device initiating a communications sequence on the serial bus by conveying a START condition. The master device arbitrates for the serial bus in an arbitration phase that includes the master device conveying an arbitration address associated with the master device on the serial bus. A controlling master device gains control of the serial bus at the end of the arbitration phase. The controlling master device conveys a repeated START condition on the serial bus, followed by a slave address addressed to the slave device. The slave device acknowledges the slave address. The controlling master conveys a data block to the slave device, and the slave device acknowledges the data block. The controlling master device ends the communications sequence by conveying a STOP condition on the serial bus.

Various embodiments of the arbitration address are contemplated. In one embodiment, the arbitration address corresponds to a slave address associated with a slave device. With at least one slave device for each master device, each arbitration address is preferably associated with only one master device. The arbitration address preferably initiates a READ cycle, and the slave device responds with a data byte. The data byte may be stored, discarded, or ignored by the master device, as desired. This feature may advantageously result in a quick end to the arbitration phase with only a controlling master device on the serial bus after the arbitration phase.

In another embodiment, the arbitration address is not associated with any slave device coupled to the serial bus. The master device is configured to continue the communications sequence without receiving acknowledge signals, either during or after the arbitration phase, in response to the associated arbitration address. The master device continues the communications sequence with a repeated START condition and repeated address and data phases for the transfer of data. The master device using an unassigned arbitration address may READ or WRITE to the unassigned address. This arbitration phase may advantageously end quickly with only a controlling master device on the serial bus after the arbitration phase.

In yet another embodiment, each arbitration address is associated with an arbitration device coupled to the serial bus. Acting as a slave device responsive to multiple slave addresses, the arbitration device may accept WRITE data and/or send READ data in response to receiving the arbitration address. The arbitration device properly acknowledges all addresses and data transfers in which it is involved. The arbitration device cleanly and quickly ends the arbitration phase with only a controlling master device on the serial bus after the arbitration phase.

BRIEF DESCRIPTION OF THE DRAWINGS

Other objects and advantages of the invention will become apparent upon reading the following detailed description and upon reference to the accompanying drawings in which.

Figure 1:
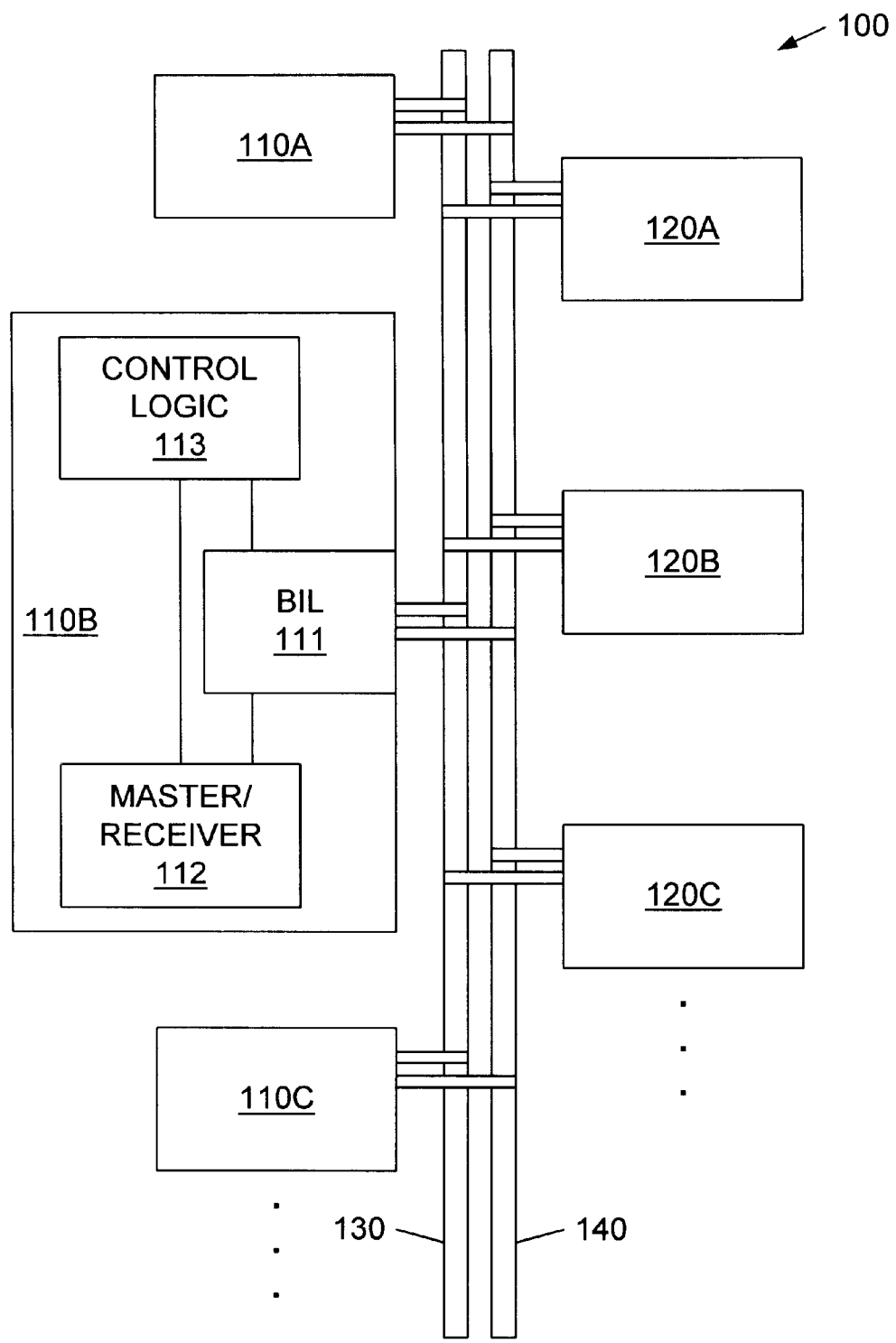
FIG. 1 is a block diagram of a typical $I^2C$-compliant system comprising devices coupled to a two-line serial bus.
Figure 2:
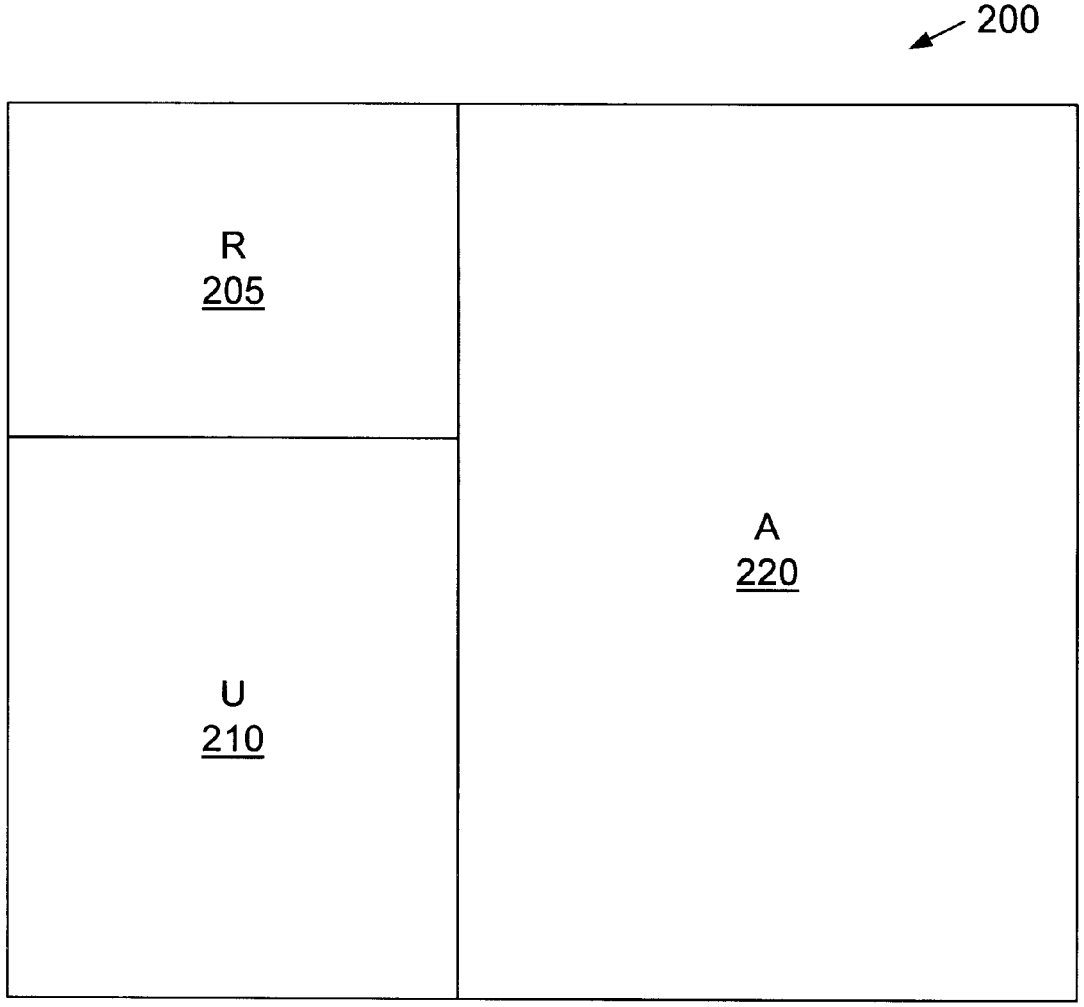
FIG. 2 is a block diagram representing a typical division of the address space for an $I^2C$-compliant system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 4:
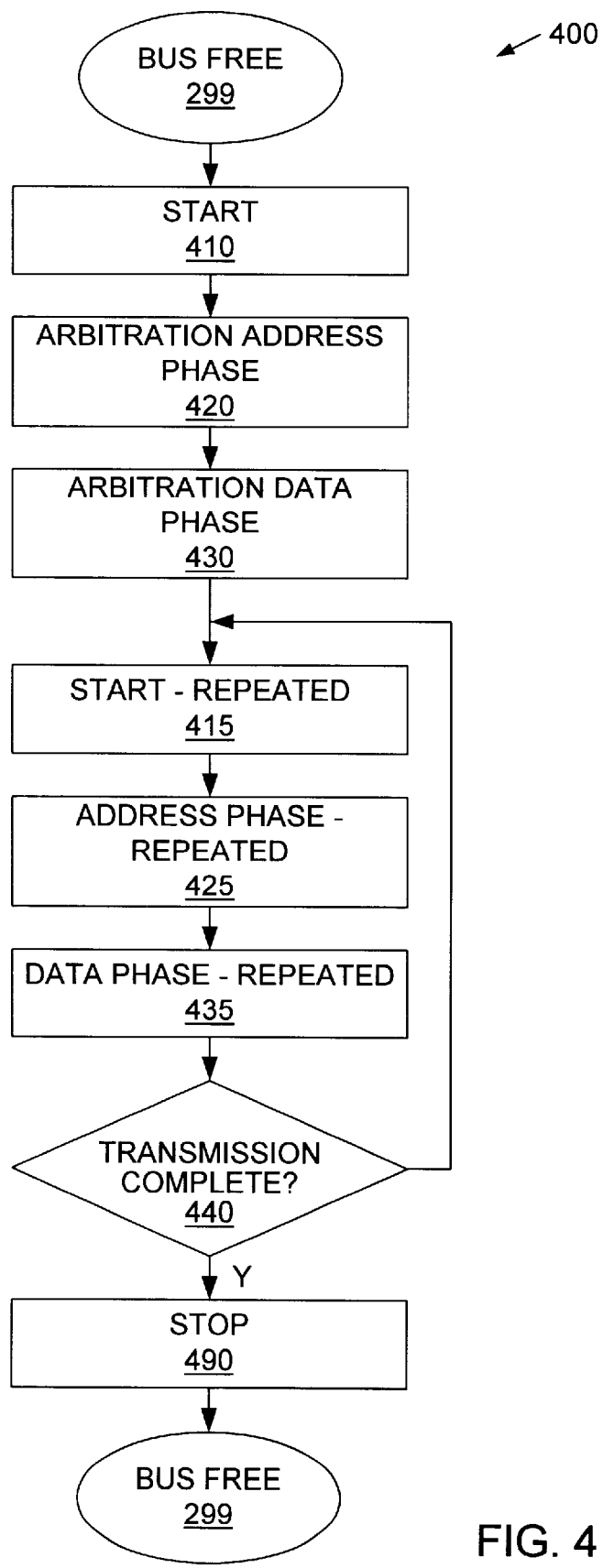
FIG. 4 is a flowchart embodiment of a communications sequence including an arbitration address phase that is compatible with an $I^2C$-compliant system.

FIG. 4—Arbitration Addresses

A flowchart of an embodiment of a communications sequence 400 including a deterministic arbitration address phase is illustrated in FIG. 4. As shown, the communications sequence 400 is compatible with the $I^2C$ protocol. A master device 110 only starts a new communications sequence 400 on the bus while the bus is free 299. The communications sequence 400 comprises, as a minimum, a START condition 410, an arbitration address phase 420, an arbitration data phase 430, a repeated START condition 415, a repeated address phase 425, a repeated data phase 435, and a STOP condition 490. The communications sequence 400 may optionally also include one or more additional repeated START conditions 415, repeated address phases 425, and repeated data phases 435. Decision block 440 either continues or ends the communications sequence 400.

Figure 3:
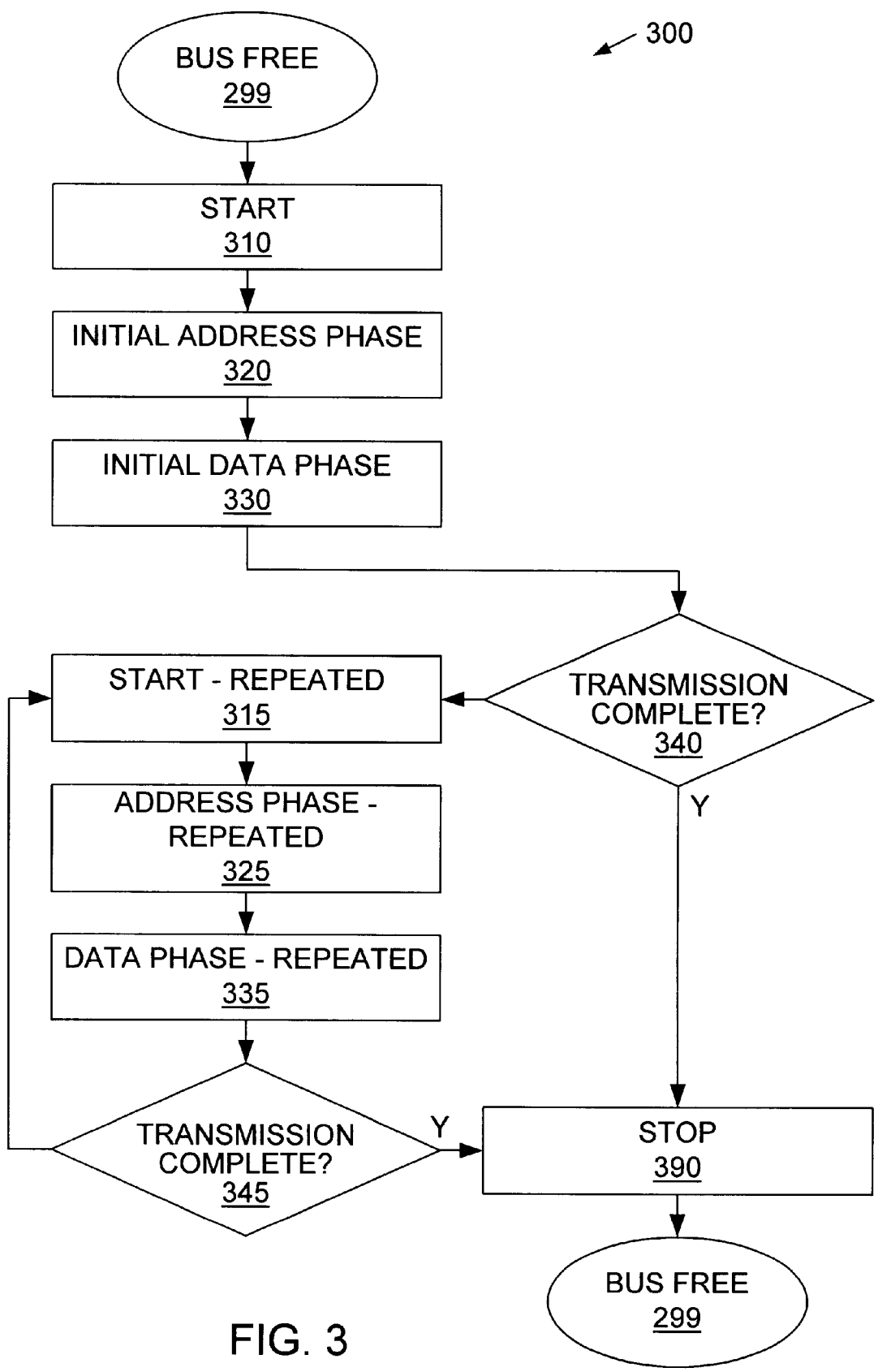
FIG. 3 is a flowchart embodiment of a communications sequence for a typical $I^2C$-compliant system.

It is noted that the arbitration address phase 420 takes the place of the initial address phase 320 in FIG. 3. The form of the arbitration address makes the arbitration address indistinguishable from any other slave address conveyed on the serial bus. Various embodiments and implementations of the arbitration address are contemplated. It is further noted that in one embodiment, the arbitration data phase 430 will not transfer data or will be skipped completely. In this embodiment, the repeated START condition 415 directly follows the arbitration address phase 420. A data block transferred during the repeated data phase(s) 435 may include one or more data bytes.

In one embodiment, the arbitration address corresponds to a slave address 210 associated with a slave device 120. With at least one slave device 120 for each master device 110, each arbitration address is preferably associated with only one master device 110. The arbitration address preferably initiates a READ cycle, and the slave device 210 responds with a data byte. The data byte may be stored, discarded, or ignored by the master device 110, as desired. The master device 110 continues the communications sequence 400 with a repeated START condition 415 and repeated address 423 and data phases 435 for the transfer of data. This feature may advantageously result in a quick end to the arbitration phase with only a controlling master device on the serial bus after the arbitration phase.

Implemented in an $I^2C$-compliant system, the master device 110 having the numerically lowest arbitration address will remain on the serial bus as the controlling master device when arbitrating for the serial bus. The controlling master device 110 preferably acknowledges the data byte read from the slave device 120 during the arbitration data phase 430. The slave device 120 is unaware that the arbitration address phase 420 and the arbitration data phase 430 are any different from any other address 320/325/425 and data phases 330/335/435.

If there are more master devices 110 than slave devices 120 connected to the serial bus, but not twice as many, it is contemplated that two master devices may be associated with each slave address used as the associated arbitration address. This is possible if the slave device 120 can both send and receive a data byte during the arbitration data phase 430 without causing unexpected behavior or an error condition. A first master device 110X is associated with the slave address as a READ cycle and a second master device 110Y is associated with the slave address as a WRITE cycle.

In another embodiment, the arbitration address 220 is not associated with any slave device 120 coupled to the serial bus. The master device 110 is configured to continue the communications sequence 400 without receiving acknowledge signals from a slave device 120 during or after the arbitration phase 420/430. The master device 110 continues the communications sequence 400 with a repeated START condition 415 and repeated address 423 and data phases 435 for the transfer of data. The master device 110 using a non-assigned slave address 220 as the arbitration address may READ or WRITE to the non-assigned address 220. This arbitration phase 420/430 may advantageously end quickly with only a controlling master device 110 on the serial bus after the arbitration phase 420/430.

It is noted that if the slave addresses with which all master devices attempt to communicate on the serial bus are well-known, then any master device attempting to communicate using the $I^2C$ communications sequence 300, instead of the deterministically arbitrated communications sequence 400, will not generate non-assigned addresses 220. Thus in an $I^2C$ environment with N master devices 110 addressing well-known slave addresses, only N–1 master devices 110 need to implement the deterministically arbitrated communications sequence 400 unless the addresses of existing slave devices 120 are used as arbitration addresses.

Figure 5:
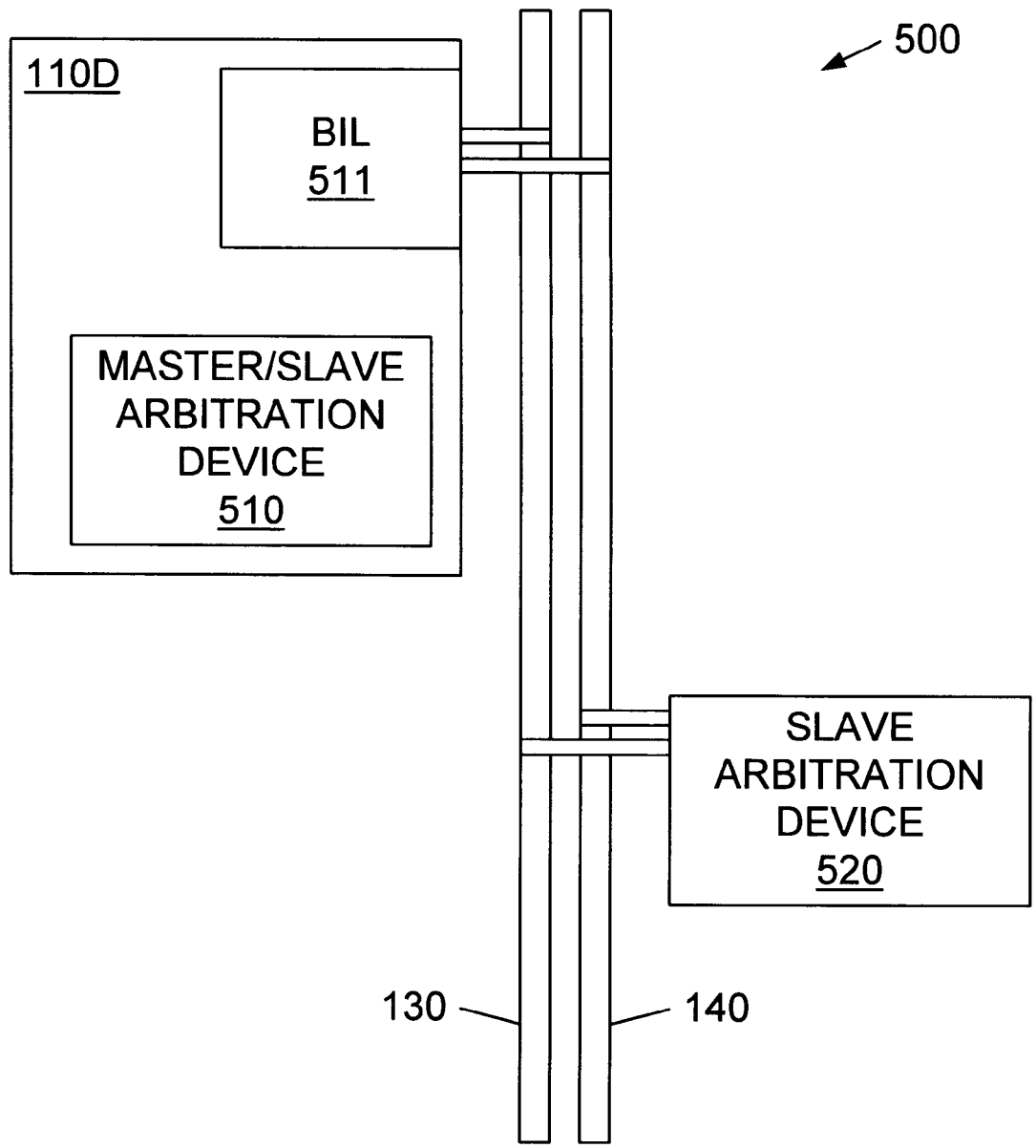
FIG. 5 is a block diagram of two embodiments of an arbitration device coupled to a two-line serial bus.

FIG. 5—Arbitration Devices

In yet another embodiment, illustrated in FIG. 5, each arbitration address is associated with an arbitration device coupled to the serial bus. Alternative implementations are shown in FIG. 5: a master/slave arbitration device 510 and a slave arbitration device 520. The master/slave arbitration device 510 is comprised as part of a master device 110B capable of acting as a master/receiver through bus interface logic 511. Slave arbitration device 520 couples to and responds on the serial bus similarly to any slave device 120. The arbitration device 510/520 is especially useful in systems including more master devices 110 than slave devices 120. Using the arbitration device 510/520 also guarantees correct acknowledgements of addresses and data transfers. This may advantageously reduce master device error conditions involving unacknowledged transfers on the data line 130 of the serial bus.

Acting as a slave device 120 responsive to multiple slave addresses, the arbitration device 510/520 may accept WRITE data and/or send READ data in response to receiving any one of the arbitration addresses associated with the arbitration device 510/520. The arbitration device 510/520 properly acknowledges all addresses and data transfers in which it is involved. The arbitration device 510/520 cleanly and quickly ends the arbitration phase with only a controlling master device 110 on the serial bus after the arbitration phase. The master device 110 continues the communications sequence 400 with a repeated START condition 415 and repeated address 423 and data phases 435 for the transfer of data.

In one implementation, one or master devices 110X–Z are each associated with more than one arbitration address. Master device 110X conveys a first arbitration address on the serial bus to request a normal, or low, priority data transfer. Master device 110X conveys a second arbitration address on the serial bus to request a higher priority data transfer. Additional arbitration addresses, designated for higher priority data transfers, may also be associated with master device 110X, as desired. The arbitration device 510/520 responds accordingly to the multiple arbitration addresses associated with master device 110X.

Numerous variations and modifications will become apparent to those skilled in the art once the above disclosure is fully appreciated. It is intended that the following claims be interpreted to embrace all such variations and modifications.

What is claimed is:

1. A system, comprising:
   a serial bus including a clock line and a data line;
   a master device coupled to the serial bus, wherein the master device is configured to transfer data on the serial bus in a communications sequence, wherein the communications sequence is initiated by a START condition conveyed on the serial bus, followed by an arbitration phase, and subsequently followed by a data transfer phase, and wherein an arbitration address associated with the master device is conveyed upon the serial bus by the master device during the arbitration phase.

2. The system of claim 1, wherein the START condition is conveyed on the serial bus only while the serial bus is free.

3. The system of claim 1, wherein the clock line and the data line are each passively pulled HIGH except when any device actively asserts logic LOW signals on the clock line or data line, respectfully.

4. The system of claim 3, wherein the master device transfers data in accordance with an I²C-compatible protocol.

5. The system of claim 1, wherein the master device conveys the START condition on the serial bus by transitioning the data line from HIGH to LOW while the clock line is HIGH.

6. The system of claim 1, wherein the arbitration phase includes an address portion and a data portion, wherein the address portion includes the master device generating clock pulses on the clock line while conveying the arbitration address on the data line.

7. The system of claim 1, wherein a data bit is valid on the data line of the serial bus when the data bit is stable when the clock line is clocked HIGH.

8. The system of claim 1, wherein the communications sequence is terminated with a STOP condition conveyed on the serial bus by the master device.

9. The system of claim 8, wherein the master device conveys the STOP condition on the serial bus by transitioning the data line from LOW to HIGH while the clock line is HIGH.

10. The system of claim 1, wherein the arbitration address corresponds to a slave address which is not assigned to a slave device, and wherein the master device is further configured to continue processing the communications sequence if the slave address is not acknowledged by the slave device.

11. The system of claim 1, wherein the master device is further configured to terminate the communications sequence on the serial bus upon detecting the data line LOW when the serial bus interface logic is not driving the data line LOW, wherein the communications sequence is terminated no later than the end of a current byte being conveyed on the serial bus.

12. The system of claim 1, wherein the data transfer phase includes an address and a data block, the system further comprising:
   one or more slave devices coupled to the serial bus, wherein each of the one or more slave devices has an associated slave address and is configured to respond on the serial bus with an acknowledge signal during an immediately following clock cycle whenever the address of the data transfer phase corresponds to the associated slave address.

13. The system of claim 12, wherein the arbitration address corresponds to a slave address which is assigned to a slave device.

14. The system of claim 12, wherein a WRITE cycle is signified by a "0" as the least significant bit of the address of the data transfer phase, wherein said each of the one or more slave devices is further configured to respond on the serial bus with the acknowledge signal in the clock cycle immediately following receipt of each byte of the data block during the WRITE cycle.

15. The system of claim 12, wherein a READ cycle is signified by a "1" as the least significant bit of the address of the data transfer phase, wherein the master device is further configured to respond on the serial bus with the acknowledge signal in the clock cycle immediately following receipt of each byte of the data block during the READ cycle, except for a final data byte.

16. The system of claim 1, further comprising:
   a second master device coupled to the serial bus, wherein the second master device is configured to transfer data on the serial bus in the communications sequence, and wherein a second arbitration address associated with the second master device is conveyed upon the serial bus by the second master device during the arbitration phase.

17. The system of claim 16, wherein when the master device and the second master device contemporaneously initiate respective communications sequences by conveying the START condition on the serial bus, the master device then conveys the arbitration address on the serial bus while the second master device conveys the second arbitration address on the serial bus, wherein the master device and the second master device are further configured to terminate a respective communications sequence on the serial bus upon detecting the data line LOW when not driving the data line LOW, wherein the communications sequence is terminated no later than the end of a current byte being conveyed on the serial bus, wherein either the master device or the second master device will terminate the respective communications sequence by the data transfer phase.

18. The system of claim 17, further comprising:
an arbitration device coupled to the serial bus, wherein the arbitration device has an associated slave address corresponding to the arbitration address of at least N−1 master devices of the N master devices coupled to the serial bus, wherein N is an integer equal to 2 or more, wherein the arbitration device is configured to respond on the serial bus with an acknowledge signal during an immediately following clock cycle whenever the address of the arbitration phase corresponds to any of the associated slave addresses.

19. The system of claim 18, wherein the arbitration device is further configured to respond on the serial bus with a data byte in response to a READ cycle during the immediately following clock cycle after the acknowledge signal during an immediately following clock cycle whenever the address of the arbitration phase corresponds to any of the associated slave addresses, and wherein each master device is further configured to follow the data byte with a repeated START condition during the immediately following clock cycle after the data byte.

20. The system of claim 17, further comprising:
one or more slave devices coupled to the serial bus, wherein each of the one or more slave devices has an assigned slave address and is configured to respond on the serial bus with the acknowledge signal during an immediately following clock cycle whenever the address of the arbitration phase corresponds to the assigned slave address.

21. The system of claim 20, wherein the controlling master device remaining on the serial bus after the arbitration phase is further configured to convey a repeated START condition on the serial bus to initiate the data transfer phase, to convey the assigned slave address of a target slave device on the serial bus, and either to convey a write data block to the target slave device on the serial bus or to receive a read data block from the target slave device on the serial bus.

22. The system of claim 21, wherein the target slave device is configured to respond on the serial bus with the acknowledge signal during an immediately following clock cycle in response to each byte of the write data block.

23. The system of claim 21, wherein the controlling master device is further configured to respond on the serial bus with the acknowledge signal during an immediately following clock cycle in response to each byte of the read data block, except for a final data byte.

24. The system of claim 1, wherein each arbitration address is associated with only one master device.

25. The system of claim 24, wherein each arbitration address is further associated with only one slave device.

26. A system, comprising:
a serial bus including a clock line and a data line, wherein the serial bus transfers data according to an I²C-compatible protocol;
a master device coupled to the serial bus, wherein the master device is configured to transfer data on the serial bus in a communications sequence according to the I²C-compatible protocol, wherein the START condition of the communications sequence is followed by an arbitration phase during the initial address and initial data phases, wherein an arbitration address associated with the master device is conveyed upon the serial bus by the master device during the arbitration phase.

27. The system of claim 26, wherein the arbitration address corresponds to a slave address which is not assigned to a slave device, and wherein the master device is further configured to continue the communications sequence by conveying a repeated START condition on the serial bus if the slave address is not acknowledged or if the initial data phase is not acknowledged.

28. The system of claim 26, further comprising:
one or more slave devices coupled to the serial bus, wherein the one or more slave device are each configured to transfer data according to the I²C-compatible protocol.

29. The system of claim 28, wherein the arbitration address corresponds to a slave address which is assigned to a slave device, wherein the least significant bit of the arbitration address is a "1", indicating a READ cycle, wherein the slave device responds on the serial bus by conveying a data byte to the master device in response to receiving the arbitration address, and wherein the master device is further configured to continue the communications sequence in response to the slave device responding on the serial bus by conveying the data byte.

30. The system of claim 26, further comprising:
a second master device coupled to the serial bus, wherein the second master device is configured to transfer data on the serial bus in the communications sequence according to the I²C-compatible protocol, and wherein second arbitration address associated with the second master device is conveyed upon the serial bus by the second master device during the arbitration phase.

31. The system of claim 30, wherein when the master device and the second master device contemporaneously initiate respective communications sequences by conveying a START condition on the serial bus, during the initial address phase the master device conveys the arbitration address on the serial bus while the second master device conveys the second arbitration address on the serial bus,
wherein the master device and the second master device are further configured to terminate a respective communications sequence on the serial bus according to the I²C-compatible protocol upon detecting the data line LOW when not driving the data line LOW, and wherein either the master device or the second master device terminates the respective communications sequence before a repeated START condition, leaving only one master device active on the serial bus.

32. The system of claim 30, further comprising:
an arbitration device coupled to the serial bus, wherein the arbitration device is configured to transfer data according to the I²C-compatible protocol, wherein the arbitration device has an associated slave address corresponding to the arbitration address of at least N−1 master devices of the N master devices coupled to the serial bus, wherein N is an integer equal to 2 or more.

33. A method for operating a serial bus, wherein at least one master device and at least one slave device are coupled to the serial bus, the method comprising:
a master device initiating a communications sequence on the serial bus by conveying a START condition on the serial bus;

the master device participating in an arbitration phase by conveying an arbitration address on the bus, wherein the arbitration address is associated with the master device;

a controlling master device gaining control of the serial bus at the end of the arbitration phase, wherein the controlling master device is associated with the numerically lowest arbitration address of all master devices participating in the arbitration phase;

the controlling master device conveying a first repeated start condition on the serial bus;

the controlling master device conveying a slave address on the serial bus;

the slave device with which the slave address is associated responding on the serial bus with an acknowledge signal in response to the slave address;

the controlling master device conveying a data block on the serial bus, wherein the data block is addressed to the slave device with which the slave address is associated;

the slave device with which the slave address is associated responding on the serial bus with the acknowledge signal in response to the data block; and the controlling master device ending the communications sequence on the serial bus by conveying a STOP condition on the serial bus.

34. The method of claim 33, wherein a second slave device with a second associated slave address is also coupled to the serial bus, the method further comprising:

the controlling master device conveying another repeated start condition on the serial bus immediately after the acknowledge signal in response to the data block;

the controlling master device conveying the second slave address on the serial bus;

the second slave device with which the second slave address is associated responding on the serial bus with the acknowledge signal in response to the second slave address;

the controlling master device conveying a second data block on the serial bus, wherein the second data block is addressed to the second slave device with which the second slave address is associated;

the second slave device with which the second slave address is associated responding on the serial bus with the acknowledge signal in response to the second data block.

35. The method of claim 33, wherein a second master device with a second arbitration address is also connected to the serial bus, wherein the arbitration address is numerically lower than the second arbitration address, the method further comprising:

the second master device initiating a second communications sequence on the serial bus by conveying the START condition on the serial bus contemporaneously with the master device initiating the communications sequence on the serial bus by conveying the START condition on the serial bus;

the second master device participating in the arbitration phase by conveying the second arbitration address on the bus contemporaneously with the master device conveying the arbitration address on the bus; and the second master device ending the second communications sequence on the serial bus in response to the arbitration address output on the serial bus by the master device, wherein the master device continues the communications sequence as the controlling master device.

36. The method of claim 33, wherein the serial bus transfers data according to an $I^2C$-compatible protocol.

37. A method for operating a communications system, wherein the communications system includes a serial bus and a plurality of devices connected to the serial bus, the method comprising:

associating an arbitration address with each master device connected to the serial bus, wherein each master device is configured to assert its associated arbitration address on the serial bus during an arbitration phase associated with a communications sequence;

associating a slave address with each slave device connected to the serial bus, wherein a slave device responds on the serial bus to one of the master devices of the plurality of master devices when the one outputs the slave address associated with the slave device;

one or more master devices participating in an arbitration phase of the communications sequence by each of the one or more master devices conveying its associated arbitration addresses on the serial bus during the arbitration phase;

a controlling master device gaining control of the serial bus at the end of the arbitration phase, wherein the controlling master device is associated with the numerically lowest arbitration address of all master devices participating in the arbitration phase;

the controlling master device conveying on the serial bus the slave address associated with a first slave device;

the first slave device responding to the controlling master device by acknowledging receipt of the slave address associated with the first slave device; and the controlling master device conveying a data block on the serial bus, wherein the data block is addressed to the first slave device.

38. A serial bus interface logic configured to arbitrate for a serial bus, wherein the serial bus interface logic is configured to initiate a communications sequence by conveying a START condition on the serial bus, wherein the serial bus interface logic is further configured to convey an arbitration address on the serial bus immediately following the START condition.

39. The serial bus interface logic of claim 38, wherein the serial bus interface logic transfers data on the serial bus according to an $I^2C$-compatible protocol.

40. The serial bus interface logic of claim 38, wherein the arbitration address corresponds to a slave address which is assigned to a slave device.

41. The serial bus interface logic of claim 38, wherein the arbitration address corresponds to a slave address which is not assigned to a slave device, and wherein the serial bus interface logic is further configured to continue processing the communications sequence if the arbitration address is not acknowledged.

42. The serial bus interface logic of claim 38, wherein the arbitration address is associated with an arbitration device which is configured to respond on the serial bus with an acknowledge signal in the clock cycle immediately following receipt of the arbitration address.

43. The serial bus interface logic of claim 38, wherein the serial bus interface logic is further configured to terminate the communications sequence on the serial bus upon detecting the data line LOW when the serial bus interface logic is not driving the data line LOW, wherein the communications sequence is terminated no later than the end of a current block being conveyed on the serial bus.

* * * * *